Figure 1:
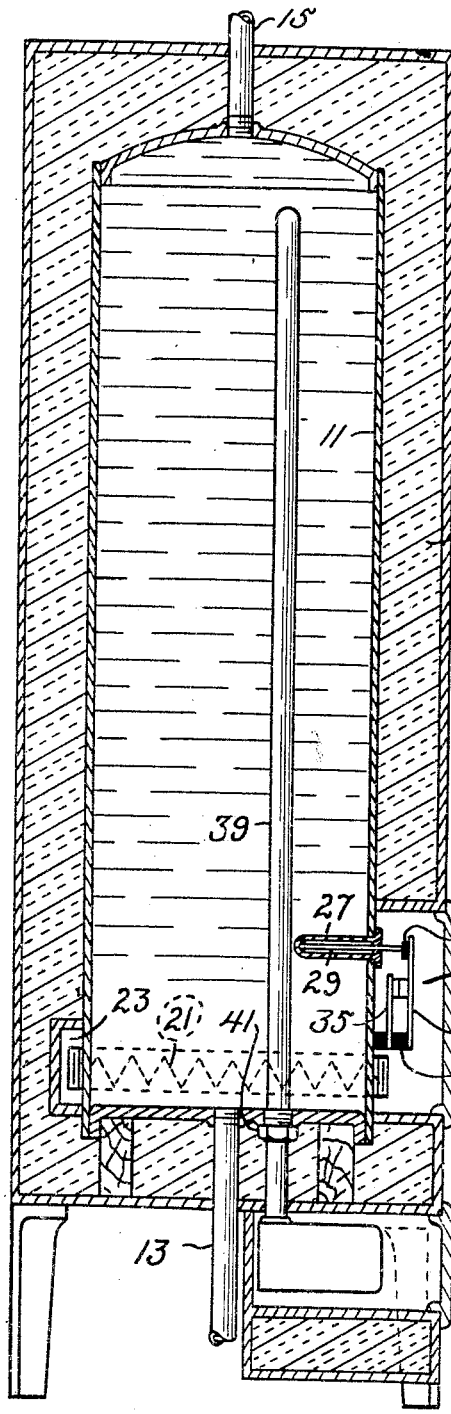

Oct. 16, 1945.  C. M. OSTERHELD  2,387,176
WATER HEATER CONTROL SYSTEM
Filed Jan. 17, 1944  2 Sheets-Sheet 1

INVENTOR.
CLARK M. OSTERHELD
BY H. M. Bielel
ATTORNEY

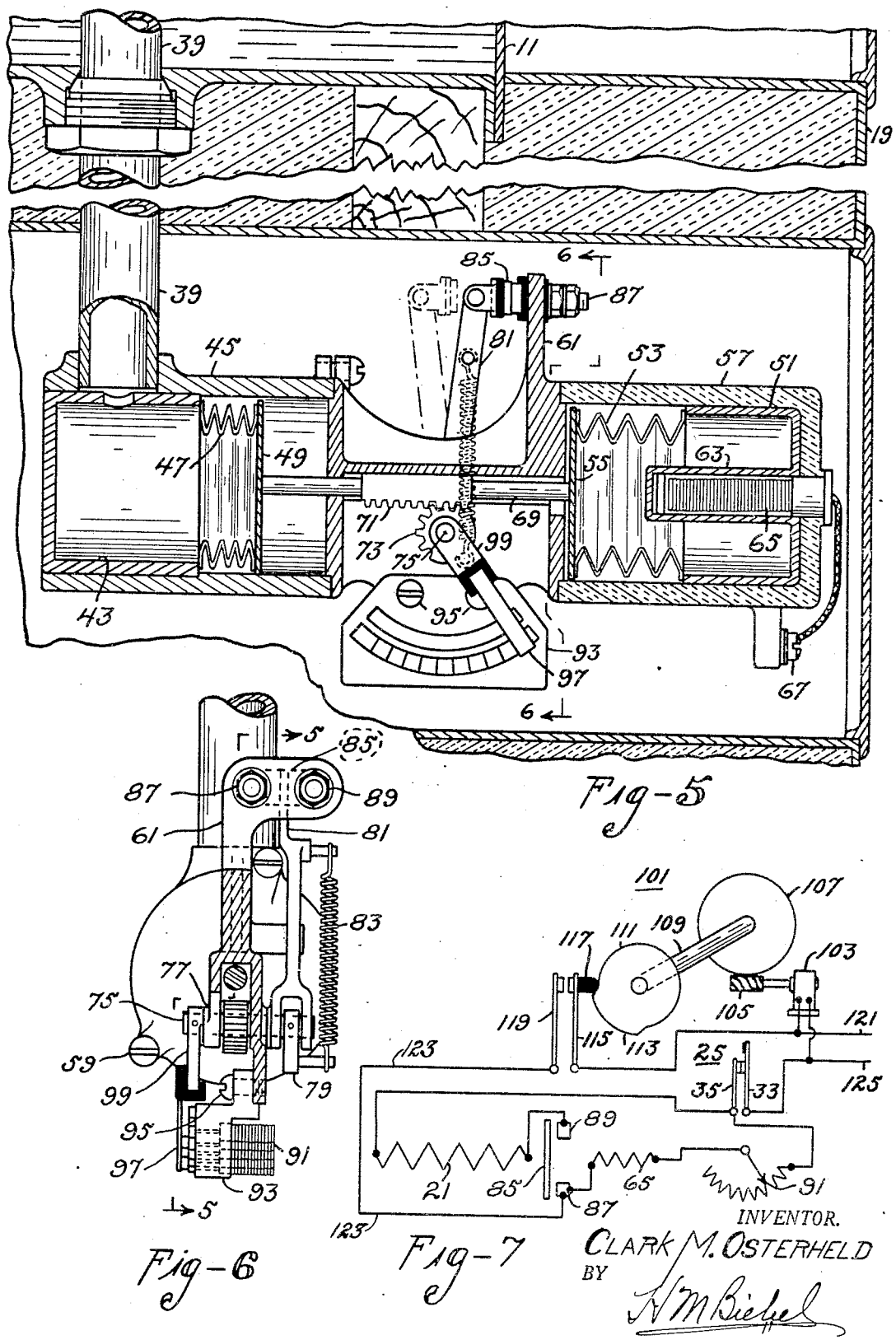

Patented Oct. 16, 1945

2,387,176

UNITED STATES PATENT OFFICE 2,387,176

WATER HEATER CONTROL SYSTEM

Clark M. Osterheld, Stoughton, Wis., assignor to McGraw Electric Company, Elgin, Ill., a corporation of Delaware Application January 17, 1944, Serial No. 518,634

9 Claims. (Cl. 219—39)

My invention relates to control systems and particularly to tank water heater control systems.

An object of my invention is to provide a control system for an electric tank heater that shall effect energization of the heater either immediately or with a time delay dependent on the amount of cold water in the tank.

Another object of my invention is to provide a control system for an electric tank heater that shall effect energization of the heater either immediately or with a time period of delay after the start of an off-peak period in accordance with the amount of cold water in the tank.

Other objects of my invention will either be apparent from a description of a system embodying my invention or will be pointed out during the course of such description and set forth in the appended claims.

Figure 2:
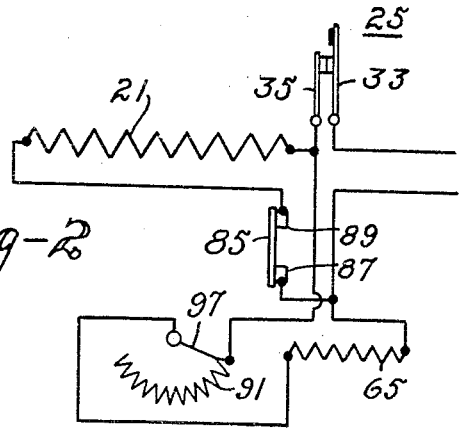
Figure 3:
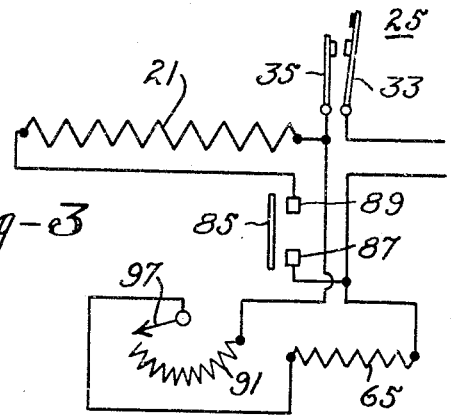
Figure 4:
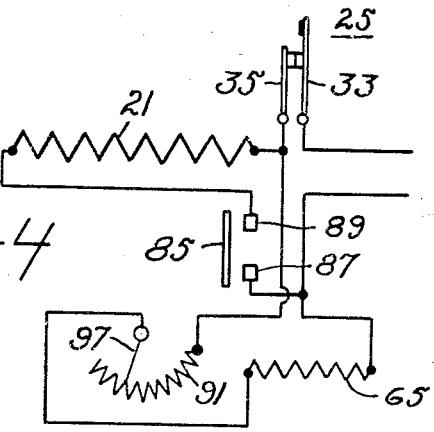

In the drawings,

Figure 1 is a vertical, sectional view through a domestic hot water tank having associated therewith a control system embodying my invention, Fig. 2 is a diagram of the electric circuits showing the position of the contacts when the tank is full of cold water, Fig. 3 is the same as Fig. 2 except that the positions of the contacts are as when the tank is full of hot water, Fig. 4 is the same as Fig. 2 except the positions of the contacts are shown as when the tank contains cold water in the lower portion and warm water in the upper portion, Fig. 5 is a vertical, sectional view of the retarder taken on the lines 5—5 of Fig. 6 with the parts shown in the position occupied thereby when the tank is full of cold water, Fig. 6 is a vertical, fragmentary, sectional view taken on the line 6—6 of Fig. 5, and, Fig. 7 is a diagram of connections of a modified form of my control system.

Referring first to Fig. 1 of the drawings I have there shown a domestic hot water tank 11 having a lower cold water inlet pipe 13, an upper hot water outlet pipe 15, the tank being covered with suitable heat insulating material 17, such as rock wool, which is held in proper operative position around the tank by an outer casing 19. I provide preferably, but not necessarily, a single electric heater 21 which, if only a single heater is provided, is located near the lower end portion of the tank and may be of any suitable or desired kind. I prefer to use a clamp-on heater positioned within a tunnel 23. All of the details thus far described are old and well known in the art.

I provide a lower heater control switch designated generally by numeral 25 and have shown it schematically only as comprising a tube 27 having a closed inner end and having its open outer end secured to tank 11 in a water-tight manner. I provide an expansion rod 29 in the tube 27 which rod is adapted to engage with and be disengaged from a lug 31 of electric-insulating material secured to the outer end of a resilient contact arm 33. Contact arm 33 is adapted to be engaged with and disengaged from a substantially rigid contact arm 35, the two contact arms being supported as by blocks 37 of electric-insulating material. The bar 33 is normally in engagement with bar 35 when permitted to do so by reason of the short length of expansion rod 29 because of being subject to cold water and is adapted to be disengaged from contact arm 35 when rod 29 has increased in length because of being subject to hot water. I may say that by cold water I mean water which may have a temperature on the order of 65° F. or 70° F., while by hot water I mean water which is at a temperature of 150° F. or slightly higher.

I provide an enlongated tube 39 which has a closed inner end and has its outer end in screw threaded engagement with the lower end closure of the tank and extends slightly therebelow. I may provide a lock nut 41 on the tube 39 outside of and below the bottom closure plate to ensure that there shall be no leakage of water during operation of the device. I provide a member 43 of cup-shape positioned within a tubular member 45, the latter member being secured in a fluid-tight manner to the lower open end of tube 39. Tube 43 has one closed and one open end. A bellows or expansion chamber 47 is secured to the open end and has a closure plate 49 secured to the other end thereof to provide a substantially closed chamber comprising the elongated tube 39 which extends through substantially the entire length of the tank, the member 43 and the bellows or expansion chamber 47. Within this closed chamber I provide or locate a thermally-expansible substance so that the length of the bellows 47 will be greatly shortened when the tube 39 is subject to cold water in the tank and will be increased when subject to hot water in the tank.

I provide a second expansion chamber located co-axially with the first chamber, the second chamber comprising a tubular member 51 having a closed outer end and an open inner end to which inner end is secured one end portion of a bellows 53. The other end of bellows 53 has secured thereto a closure plate 55. The two members 51 and 53 are supported by a member 57 of cup-shape having a substantially closed outer end and an open inner end, which inner end is secured in any suitable or desired manner as by screws 59 to an intermediate member 61 connecting the member 57 with member 45.

I provide a relatively small tube 63 with closed inner end, which extends co-axially with the outer member 51 and has fluid-tight engagement therewith to provide a central bore within the member 51 and the bellows 53. I provide further an electric heating coil 65 within the tube 63, the terminals of coil 65 being connected to contact terminals 67.

The space in bellows 53 and member 51 has therein a thermally-vaporizable substance which will be heated by coil 65 and be caused to vaporize at a temperature higher than to which the closed tube 39 will be subjected. When "hot" water is hereinafter referred to I mean water at a temperature of 150° F. or even slightly more and the maximum operating temperature of the substance in members 51 and 53 is preferably 300° F. or slightly more, a temperature which can be reached in from four to six hours by proper selection of the energy input into coil 65.

I connect the two plate closure members 49 and 55 by a rod 69 having a rack bar 71 thereon extending over its intermediate part. The rack bar 71 is engaged by a rack pinion 73 which is mounted on a shaft 75, which shaft is supported in bearings 77 on member 61.

Shaft 75 has fixedly mounted thereon one toggle member 79 and movably mounted thereon a second toggle arm 81, which toggle arms are connected by an over center spring 83. The upper and longer toggle member 81 has insulatedly mounted thereon a contact bridging member 85 which is adapted to engage with and be disengaged from a pair of contact members 87 and 89 which are insulatedly mounted on an upper projection of member 61. It may here be noted that the position of the contact bridging member 85, which is shown in Fig. 5 as being in engagement with contact members 87 and 89, is that occupied thereby when the tank is filled with cold water resulting in contraction of the bellows 47, movement of rod 69 and rack bar 71 toward the left (as seen in Fig. 5).

It may be pointed out here that the design, construction, and adjustment of the snap-acting switch including the two toggle arms and the over center spring is such that it has a relatively large differential of temperature between its open and its closed position, that is the temperature of the thermally-expansive substance in tube 39 and members 43 and 57 may vary between relatively wide limits before the switch is moved from closed to open position or vice versa.

I provide further a rheostat 91 which is mounted on a plate 93 of electric-insulating material which is supported from a lower portion of member 61 as by screws 95. Rheostat 91 comprises the usual plurality of contact members which are adapted to be engaged by a contact bar or brush 97 which is insulatedly mounted on a short arm 99 fixedly mounted on shaft 75.

Referring now to Fig. 2 of the drawings I have there illustrated the parts in the positions they will occupy when the tank is filled with cold water. The thermally-actuable heater control switch 25 will be in closed position, the bellows 47 will be in contracted or shortened position with the result that contact bridging member 85 will be in engagement with contacts 87 and 89 and the brush 97 will be in the position shown, that is at the right hand of the set of contacts on member 93. The result of the closed switch 25 and of the engagement of contact bridging member 85 with contacts 87 and 89 is that the heater 21 will be energized at once.

The closed switch, including the contact arms 33 and 35 will cause energization of the heating coil 65 with a relatively high energy input to cause rise of temperature of the thermally-vaporizable substance in members 51 and 53 to its maximum temperature of 300° F. or even more, within a relatively short time, say about two hours. Let it be assumed further that heating of all the water in the tank will require say six hours. It is thus obvious that the bellows 53 will be fully expanded in two hours within which time only about one-third of the contents of the tank will have been heated to a temperature of 150° F.

As more and more water in the tank is heated, the bellows 47 will tend to expand more and more whereby movement of rack bar 71 and rod 69 in a right-hand direction will take place. Such movement is counteracted by the bellows 53 so that while arm 79 and brush 97 are moved slightly in a clockwise direction, such movement is not enough to cause opening of the switch including the contacts 87 and 89 and the contact bridging member 85. When substantially all of the water in the tank is hot, expansion of rod 29 will be sufficient to cause disengagement of contact arms 33 and 35 and deenergization of the heater 21 and of the heating coil 65. The temperature of the substance in bellows 53 will decrease rapidly with the result that the bellows 47 will expand to its fullest extent to cause disengagement of the bridging member 85 from contacts 87 and 89 and movement of brush 97 out of engagement with the contacts of rheostat 91, as shown in Fig. 3.

Fig. 4 shows the position of the parts when the withdrawal of a small amount of hot water from the tank has permitted the entry of sufficient cold water into the lower part of the tank to subject the switch 25 to cold water and to close the same, with attendant energization of heating coil 65 at less than full energy input.

Referring now to Fig. 7 of the drawings, I have there shown a modified diagram of control system which I may use. In addition to the parts already hereinbefore described, I provide a constantly operative timer controlled switch 101 comprising an electric motor 103 having a worm 105 mounted on its shaft. The worm 105 engages with a worm gear 107 which is mounted on a shaft 109. Also mounted on the shaft 109 is a cam disc 111, the greater portion of the periphery of which is of uniform radius but comprises a portion 113 of slightly greater radius. is to be understood that the parts shown and luding members 103 to 113 are schematic onl  id any such device effective to cause cam disc 111 to rotate through 360° in twenty-four hours may be used in place thereof. I provide further a resilient contact arm 115 having a lug 117 of electric-insulating material on its free end, which lug is adapted to engage the peripheral surface of cam disc 111. When lug 117 engages the part 113 it will be moved into contacting engagement with a substantially rigid contact arm 119.

Contact arm 115 is connected to a supply circuit conductor 121 while contact arm 119 is connected by a conductor 123 with one terminal of heating coil 65. A second supply circuit conductor 125 is connected to contact arm 33 of the lower thermal heater control switch 25.

It is to be understood that the peripheral length of portion 113 of cam disc 111 represents the off-peak period and for illustrative purposes this may be considered to extend from about 12 midnight to 6 a. m. It is to be understood that cam disc 111 is rotated in the direction shown by the arrow, that is in a clockwise direction. It is evident that contact arms 115 and 119 will be in engagement with each other within a relatively short time because of turning movement of cam disc 111 from the position shown in Fig. 7 of the drawings. If the tank is full of cold water, heater 21 will then be energized through engaged contact arms 115 and 119, engaged contact bridging member 85 with contacts 87 and 89 and through engaged contact arms 33 and 35.

Energization of heater 21 will continue until substantially all of the water in the tank has been heated, as hereinbefore described, when opening of the lower thermal heater control switch will deenergize the same, it being assumed that the time required to heat all of the water in the tank is less than the length of the off-peak period.

Let it now be assumed that at the start of an off-peak period only one-half of the tank, that is the upper half, is full of hot water, with the result that the lower thermal heater control switch 25 will be closed but the upper toggle member 81 will be in the position shown in the broken lines in Fig. 5 of the drawings, that is contact bridging member 85 will be out of engagement with contacts 87 and 89. However, energization of heater 65 will be initiated with part of the rheostat 91 in circuit and will continue for a length of time until the energized coil 65 transmitting heat to the heat-expansible substance in member 51 and bellows 53 will cause expansion of bellows 53 and movement of arm 81 in a clockwise direction to cause engagement of contact bridging member 85 with contact terminals 87 and 89 and therefore closure of heating circuit of the heater 21 and energization thereof. This energization will continue until all of the water in the tank is hot when the circuit will be interrupted by opening of switch 25.

In that form of my invention shown in Figs. 2, 3 and 4, it is evident that energization of the heater 21 will be effected immediately upon entry of sufficient cold water into the tank 11 to cause closure not only of the switch 25 but also of the switch controlled by the bellows shown in Figs. 5 and 6. In case say one-half of the tank is full of hot water, the closed switch 25 will cause energization of the heating coil 65 and expansion of bellows 53 until turning movement of toggle arm 81 in a clockwise direction is effected, whereupon energization of heater 21 will be initiated. It is obvious that the time delay period is dependent upon the amount of cold water in the tank, this time delay period decreasing with increase in the amount of cold water in the tank. In that control system embodying my invention, as shown in Fig. 7 of the drawings, it is evident that energization of the heater 21 will take place immediately after the start of an off-peak period and attendant closure of the switch controlled thereby in case substantially all of the water in the tank is cold. If, on the other hand, the upper part of the tank is full of hot water, energization of heater 65 will be initiated when contact arms 115 and 119 are moved into engagement at the start of an off-peak period and the time delay period will be in accordance with the amount of cold water in the tank, that is the more cold water in the tank, the shorter will be the time delay period before energization of heater 21 occurs.

Various modifications may be made in the device embodying my invention without departing from the spirit and scope thereof, and all such modifications clearly coming within the scope of the appended claims shall be considered as covered thereby.

I claim as my invention:

1. A water heater system for a domestic hot water tank having a single electric heater, comprising a thermally-actuable control switch for said heater subject to tank water temperature at the bottom portion of the tank and adapted to be in closed position when subject to cold water, a second control switch for said heater connected in series circuit with said thermally-actuable switch, a thermally-actuable means for moving said second switch, having a portion in said tank extending throughout substantially its entire length, said thermally-actuable means being effective to cause closure of said second switch and immediate energization of said heating means in case the tank is filled with cold water.

2. A water heater system for a domestic hot water tank having a single electric heater, comprising a thermally-actuable control switch for said heater subject to tank water temperature at the bottom portion of the tank and adapted to be in closed position when subject to cold water, a second control switch for said heater connected in series circuit with said thermally-actuable switch, a thermally-actuable means for moving said second switch, having a portion in said tank extending throughout substantially its entire length, said thermally-actuable means being effective to cause closure of said second switch and immediate energization of said heating means in case the tank is filled with cold water, said thermally-actuable control switch causing deenergization of said heater when all of the water in the tank is hot.

3. A water heater system for a domestic hot water tank having an electric heater, comprising a first thermally-actuable control switch for said heating means subject to tank water temperature at the bottom portion of the tank and adapted to be in closed position when subject to cold water, a second thermally-actuable control switch for said heater comprising a tube extending into the tank through substantially the entire tank length, having its inner end closed and having an expansible bellows secured to its outer end and filled with a heat-expansible material, an operative connection between the bellows and said second switch to hold said second switch in closed position when the tank is full of cold water to cause immediate energization of said heating means by said two control switches in case the tank is filled with cold water.

4. A water heater system for a domestic hot water tank having an electric heater, comprising a first thermally-actuable control switch for said heating means subject to tank water temperature at the bottom portion of the tank and adapted to be in closed position when subject to cold water, a second thermally-actuable control switch for said heater in series circuit relation with said first switch and thermally-actuable control means for said second switch having one element thereof subject to the temperature of the tank water throughout substantially the entire length of the tank and effective to delay closure of said second switch and energization of said heater for a length of time increasing directly with the amount of hot water in the tank.

5. A water heater system for a hot water tank having an electric heater, comprising a first thermally-actuable control switch for said heater subject to tank water temperature at the bottom portion of the tank and adapted to be closed when subject to cold water, a second thermally-actuable control switch for said heating means in series circuit with said first switch comprising an elongated tube with closed inner end extending throughout the length of the tank and having an expansion bellows connected to its outer end, a filling of heat-expansible material in said tube and bellows, said bellows being operatively connected to said switch, a second heat-expansion bellows operatively connected to said switch in opposition to said first bellows, a heating coil for said second bellows, a rheostat connected in series circuit with said heating coil and energized by said first switch, the amount of resistance of said rheostat in circuit initially being dependent upon the amount of hot water in the tank, and effective to cause closure of said second switch and energization of said heater after a length of time decreasing directly with the amount of cold water in the tank, said tube and first bellows causing immediate energization of said heater in case the tank is filled with cold water.

6. A water heater control system for a domestic hot water tank subject to withdrawals of hot water throughout a twenty-four hour day, said tank having a cold water inlet at its lower end, a hot water outlet at its upper end and an electric heater thereon, said system comprising a first thermally-actuable heater control switch subject to tank water temperature at the lower end of the tank and adapted to be closed when subject to cold water, a second heater control switch means connected in series circuit with said first switch, a thermally-actuable means for actuating said second switch having a portion in said tank extending throughout substantially the entire length of the tank, said second switch means being adapted to be closed and cause energization of said heater with a time delay period increasing directly with the amount of hot water in the tank in case the first switch is subject to cold water.

7. A water heater control system for a domestic hot water tank subject to withdrawals of hot water during a twenty-four hour day, said tank having a cold water inlet at its lower end, a hot water outlet at its upper end and a single electric heater adjacent to its lower end adapted to be energized by an electric supply circuit having a daily off-peak period, said system including a first thermal heater control switch on the tank subject to tank water temperature adjacent to the lower end of the tank and adapted to be closed when subject to cold water, a second thermally-actuable heater control switch comprising a pair of contacts connected in series electric circuit with said heater and said first switch, a lever arm having a contact bridging member adapted to engage said pair of contacts, an expansion chamber having a tube extending into the tank and substantially throughout its length, operatively connected to said lever arm, a second expansion chamber operatively connected to said lever arm in opposition to said first chamber, a heater coil for said second chamber, a rheostat for said heater coil, the amount of resistance of said rheostat in electric circuit with said heater coil being dependent on the position of said lever arm, said first and said second switch being closed when the tank is filled with cold water, said first switch being opened to deenergize said heater when substantially all of the water in the tank is hot, withdrawal of enough hot water from the tank to subject the first switch to cold water being effective to cause closure of said second switch and energization of said heater with a time period of delay decreasing with the amount of cold water in the tank by the action of current flowing through said heating coil for said second expansion chamber.

8. A water heater system for a domestic hot water tank having an electric heater, comprising a first thermally-actuable control switch for said heating means subject to tank water temperature at the bottom portion of the tank and adapted to be in closed position when subject to cold water, a second thermally-actuable control switch for said heater in series circuit relation with said first switch and thermally-actuable control means for said second switch having one element thereof subject to the temperature of the tank water throughout substantially the entire length of the tank and effective to delay closure of said second switch and energization of said heater for a predetermined length of time in case the lower portion of the tank is filled with enough cold water to subject said first thermally-actuable switch to cold water.

9. A water heater control system for a domestic hot water tank subject to withdrawals of hot water during a twenty-four hour day, said tank having a cold water inlet at its lower end, a hot water outlet at its upper end and a single electric heater adjacent to its lower end adapted to be energized by an electric supply circuit having a daily off-peak period, said system including a first thermal heater control switch on the tank subject to tank water temperature adjacent to the lower end of the tank and adapted to be closed when subject to cold water, a timer controlled circuit switch adapted to be closed during off-peak periods, a second thermally-actuable heater control switch comprising a pair of contact members connected in series circuit with said heater, said first switch and said timer-controlled switch, a lever arm having a contact bridging member thereon adapted to engage said pair of contacts, a tube with a closed inner end in the tank extending throughout the length of the tank, an expansion bellows connected to said tube and operatively connected with said lever arm, a thermally-expansible substance in said tube and bellows, a second expansion bellows operatively connected to said lever arm in opposition to said first bellows, a heating coil for said second bellows, a rheostat for said heating coil, the amount of resistance of said rheostat in electric circuit with said heating coil being dependent on the position of said lever arm, the circuit of said heating coil and said rheostat being controlled by said first switch and said timer controlled switch, energization of said electric heater being effected through said three switches immediately upon closure of said timer-controlled switch at the start of an off-peak period in case the tank is full of cold water and being effected with a time delay period after closure of the timer-controlled switch in case the tank is partially filled with cold water, the length of said time delay period decreasing with increase in the amount of cold water in the tank.

CLARK M. OSTERHELD.